United States Patent
Samurkas et al.

(10) Patent No.: US 6,875,303 B2
(45) Date of Patent: Apr. 5, 2005

(54) METHOD OF BONDING A WINDOW TO A SUBSTRATE WITHOUT A PRIMER

(75) Inventors: Andon Samurkas, Shelby Township, MI (US); Ziyan Wu, Farmington Hills, MI (US); Sean C. Tobin, Livonia, MI (US); Daniel P. Heberer, Rochester Hills, MI (US)

(73) Assignee: Dow Global Technologies Inc., Midland, MI (US)

( * ) Notice: Subject to any disclaimer, the term of this patent is extended or adjusted under 35 U.S.C. 154(b) by 56 days.

(21) Appl. No.: 10/304,425

(22) Filed: Nov. 26, 2002

(65) Prior Publication Data

US 2003/0098114 A1 May 29, 2003

Related U.S. Application Data

(60) Provisional application No. 60/334,133, filed on Nov. 29, 2001.

(51) Int. Cl.$^7$ ................................................. H05H 1/24
(52) U.S. Cl. ...................... 156/272.6; 427/535; 427/569
(58) Field of Search .............................. 156/108, 272.2, 156/272.6; 427/532, 533, 535, 569

(56) References Cited

U.S. PATENT DOCUMENTS

| | | | |
|---|---|---|---|
| 3,707,521 A | 12/1972 | De Santis | 260/37 N |
| 3,779,794 A | 12/1973 | De Santis | 117/72 |
| 4,063,002 A | 12/1977 | Wilson, Jr. | 428/411 |
| 4,374,237 A | 2/1983 | Berger et al. | 528/28 |
| 4,525,511 A | 6/1985 | Kirby et al. | 524/528 |
| 4,625,012 A | 11/1986 | Rizk et al. | 528/28 |
| 4,687,533 A | 8/1987 | Rizk et al. | 156/307.3 |
| 4,758,648 A | 7/1988 | Rizk et al. | 528/53 |
| 4,780,520 A | 10/1988 | Rizk et al. | 528/53 |
| 5,063,269 A | 11/1991 | Hung | 524/296 |
| 5,603,798 A | 2/1997 | Bhat | 156/331.4 |
| 5,623,044 A | 4/1997 | Chiao | 528/28 |
| 5,672,652 A | 9/1997 | Bhat | 524/590 |
| 5,741,383 A * | 4/1998 | Kneisel | 156/108 |
| 5,792,811 A | 8/1998 | Bhat | 524/590 |
| 5,817,860 A | 10/1998 | Rizk et al. | 560/25 |
| 5,837,958 A | 11/1998 | Fornsel | 219/121.5 |
| 5,852,137 A | 12/1998 | Hsieh et al. | 525/458 |
| 5,922,809 A | 7/1999 | Bhat et al. | 525/131 |
| 5,976,305 A | 11/1999 | Bhat et al. | 156/331.4 |
| 6,001,214 A | 12/1999 | Hsieh et al. | 156/329 |
| 6,015,475 A | 1/2000 | Hsieh et al. | 156/331.4 |
| 6,105,589 A | 8/2000 | Vane | 134/1.1 |
| 6,133,398 A | 10/2000 | Bhat et al. | 528/60 |
| 6,649,016 B2 * | 11/2003 | Wu et al. | 156/329 |

FOREIGN PATENT DOCUMENTS

| | | |
|---|---|---|
| EP | 0889106 A1 | 1/1999 |
| WO | WO 00/46320 | 8/2000 |

OTHER PUBLICATIONS

Derwent Abstract 1988–148588, Internal laminate for shatter-resistant windscreen or window, Banning et al, German Patent No. 3739211.

* cited by examiner

*Primary Examiner*—John T. Haran
(74) *Attorney, Agent, or Firm*—Norman L. Sims

(57) ABSTRACT

The invention is a process for bonding glass to a substrate without the need to prime the surface of the substrate. The process comprises, first, treating the surface of the substrate with air plasma, applying to the surface of the substrate or to the surface of the glass an adhesive capable of bonding to the treated substrate and glass, and contacting the glass and the substrate with the adhesive disposed between the substrate and the glass, and allowing the adhesive to cure. Preferably the substrate is coated with a coating. Preferred adhesives are polyurethane or silane functional elastomeric adhesives.

The process of the invention allows bonding of glass to a substrate without the need to use a primer on the substrate prior to application of the adhesive. The process is especially effective in facilitating the bonding of glass to coated substrates, especially substrates coated with acid resistant coatings such as PPG's carbamate coating or DuPont's Gen III, IV and VI coatings.

16 Claims, No Drawings

METHOD OF BONDING A WINDOW TO A SUBSTRATE WITHOUT A PRIMER

This application claims the benefit of U.S. Provisional application No. 60/334,133, filed Nov. 29. 2001.

BACKGROUND OF THE INVENTION

This invention relates to a method of bonding a window to a substrate using an adhesive without the need for a primer.

Polyurethane sealant compositions typically are used for bonding non-porous substrates, such as glass, to nonporous substrates, these are described in U.S. Pat. No. 4,374,237 and U.S. Pat. No. 4,687,533, both incorporated herein by reference. U.S. Pat. No. 4,374,237 describes a polyurethane sealant containing urethane prepolymers which have been further reacted with secondary amine compounds containing two silane groups. U.S. Pat. No. 4,687,533 describes a polyurethane sealant containing urethane prepolymers which contain silane groups which have been prepared by reacting a polyisocyanate having at least three isocyanate groups with less than an equivalent amount of an alkoxysilane having a terminal group containing active hydrogen atoms reactive with isocyanate groups to form an isocyanatosilane having at least two unreacted isocyanate groups. In a second step, the isocyanatosilane is mixed with additional polyisocyanate and the mixture is reacted with a polyol to form a polyurethane prepolymer having terminal isocyanato groups and pendant alkoxysilane groups.

However, when such sealants are used to bond glass substrates to painted substrates, such as for window installation in vehicle manufacturing, the lap shear strength of the bonded substrate may be less than desirable for safety or structural purposes. Consequently, a separate paint primer comprising a solution of one or more silanes or isocyanates is typically applied to a painted substrate prior to the application of the sealant in most vehicle assembly operations for bonding the windshield and the rear window. The use of a primer in assembly operations is undesirable in that it introduces an extra step, additional cost, the risk of marring the paint surface if dripped on an undesired location, and exposes the assembly line operators to additional chemicals.

Automotive OEMs have demanded that the paint suppliers provide more robust acid resistant paint systems which stand up to harsh environmental conditions. These paint systems are difficult to bond to due to the increased chemical resistance of the paints. One problem with developing an adhesive which bonds to these paint systems on an automobile is that there are several different paint chemistries. Examples of paints which are difficult to bond to are the DuPont silanated urethane melamine, the PPG carbamate melamine paints and the acid resistant acrylic melamine paints from DuPont. What is needed is a method of improving the adhesion of adhesives to painted substrates.

SUMMARY OF THE INVENTION

The invention is a process for bonding glass to a substrate without the need to prime the surface of the substrate. The process comprises, first, treating the surface of the substrate with air plasma, applying to the surface of the substrate or to the surface of the glass an adhesive capable of bonding to the treated substrate and glass, and contacting the glass and the substrate with the adhesive disposed between the substrate and the glass, and allowing the adhesive to cure. Preferably the substrate is a plastic surface or coated with a coating. Preferred adhesives are polyurethane and adhesives.

The process of the invention allows bonding of glass to a substrate without the need to use a primer on the substrate prior to application of the adhesive. The process is especially effective in facilitating the bonding of glass to coated or plastic substrates, especially substrates coated with acid resistant coatings such as PPG's carbamate coating or DuPont's hydroxymelamine, silanated melamine, and silanated urethane melamine coatings.

DETAILED DESCRIPTION OF THE INVENTION

Air plasma as used herein refers to a stream of air charged with a large amount of energy. Air plasma behaves like a gas and it emits light and contains free ions and electrons, the molecules and ions are highly energized. Preferably the stream is a homogeneous, zero voltage, flame like plasma beam. When air plasma is directed at the surface of an object at high speed the plasma reacts with the surface to clean it and to activate the surface. It is believed the surface is activated by breaking polymer chains and creating polar groups and active radicals. The oxygen in the energized plasma also reacts with contaminants, such as hydrocarbons on the surface of substrates. A preferred device for applying the air plasma is a Flume™ Plasma System available from Plasmatreat® North America Inc., Mississauga, Ontario, Canada. The Flume™ Plasma System is applied in an open air environment under atmospheric conditions including atmospheric pressure. The plasma is generated by a controlled electrical discharge inside a jet. Air flow of standard air through the jet projects the plasma outside of the jet onto a substrate surface. Preferably the air feed is oil and water free compressed air. The electric discharge in the jet uses a 3 to 5 kV internal electrode and a plasma generator of at least FG1001 with 1 KW fed with 480 or 600 volts tri-phase, 30 amps. The jet rotation speed is preferably at least 1000 rpm.

The key to improving the adhesion of the adhesive to the substrate is to increase the surface tension of the coated surface. As each coating and adhesive is different a specific threshold surface tension level cannot be defined for all systems. Nevertheless, a surface tension over about 40 dynes and preferably over about 45 dynes is advantageous. Another goal of the treatment is to improve the surface chemistry of the coating to increase the number of reactive sites on the surface. Reactive sites refer to the number of functional groups on the surface (such as active hydrogen containing groups, hydroxyl groups and the like) which react with the isocyanate groups of the adhesive. To achieve the desired objective several parameters can be varied. Generally longer exposure time increases surface tension and availability of functional groups on the surface. On the other hand if the exposure time is too long the surface can be damaged and the adhesion of the adhesive is negatively impacted. Exposure time is discussed hereinafter as a function of line speed. A second variable which impacts adhesion is the distance between the nozzle of the air plasma jet and the substrate. Acceptable distances are defined hereinafter. Generally the closer the nozzle is to the substrate the better the adhesion performance of the adhesive, although if it gets too close to the substrate the adhesion is negatively affected. It is desirable that the substrate be in contact with the yellow portion of the plasma. Another variable which impacts adhesion is the power level applied to the plasma jet. Adhesion increases with increasing power to a point at which the power is so high as to damage the coating. These variables are independent and the setting for each must be set with the level of the others taken into account. Further the adhesive can be chosen to enhance the adhesion to treated substrate, the specifics will be discussed hereinafter.

In the process of the invention the plasma stream is applied to the substrate at a distance, from the nozzle of the jet to the substrate, of at least about 3 mm, preferably at least about 6 mm, and no greater than about 25 mm, more preferably no greater than about 20 mm and preferably no greater than about 12 mm. The plasma stream is applied to the substrate at a speed of about 1.5 meters (m) or greater per minute, preferably about 10 meters/minute or greater and about preferably about 75 m per minute or less, more preferably about 25 m/minute or less and most preferably about 20 m/minute or less. Alternatively, the substrate can be treated multiple times with the plasma treatment. The substrate surface is exposed to the plasma jet for a sufficient time to achieve the desired surface tension. This can be achieved by using a slow line speed, using multiple passes or a combination thereof. Multiple as used herein means more than 1. If more then one treatment or pass is used, preferably 2 to 3 treatments or passes are used and more preferably 2 passes or treatments. Multiple passes or treatments mean the substrate is contacted with one or more plasma jets more than one time. After treatment the adhesive is applied to the treated surface. The adhesive can be applied to the surface independently and the glass thereafter contacted with the adhesive. Alternatively the adhesive can be applied to the glass surface then the adhesive on the glass is contacted with the treated surface.

The plasma stream can be contacted with the substrate surface by hand or attached to a robot and robotically applied. Alternatively, the substrate can be placed on a moving conveyor or the like and passed under one or more stationary or rotating plasma jets. The plasma stream preferably is applied in a width of at least about ¼ of an inch (6.35 cm) to at least about 5 inches (12.7 cm), preferably about 4 inches (10.16 cm) or less and more preferably about 1 inch (2.54 cm) or less depending on the model used. A series of more than one plasma jets may be applied to the substrate if the desired treatment width is greater than the width of one jet.

The adhesive useful in the process of the invention can be any adhesive known to those skilled in the art of bonding glass to substrates. Included in the useful adhesives are polyurethane based isocyanate functional adhesives, polysulfide adhesives, and siloxane functional adhesives. Among preferred polyurethane based isocyanate functional adhesives preferred are those disclosed in De Santis U.S. Pat. No. 3,707,521; Rizk U.S. Pat. No. 4,625,012; Rizk U.S. Pat. No. 4,687,533; Rizk et al. U.S. Pat. No. 4,758,648; Rizk et al. U.S. Pat. No. 4,780,520; Hung U.S. Pat. No. 5,063,269; Chiao U.S. Pat. No. 5,623,044; Bhat U.S. Pat. No. 5,603,798; Bhat U.S. Pat. No. 5,672,652; Bhat U.S. Pat. No. 5,792,811; Bhat et al.; U.S. Pat. No. 5,922,809; Bhat et al. U.S. Pat. No. 5,976,305; Rizk et al. U.S. Pat. No. 5,817,860; Hsieh et al. U.S. Pat. No. 5,852,137; Hsieh et al. U.S. Pat. No. 6,015,475; Hsieh et al. U.S. Pat. No. 6,001,214; Bhat et al. U.S. Pat. No. 6,133,398; Wu et al. Ser. No. 09/498,084 filed Feb. 4, 2000 (PCT Publication WO 0046320) titled "Polyurethane Sealant Compositions"; all incorporated herein hereby reference. The polyurethane adhesives preferably comprise a polyurethane prepolymer which has active hydrogen and/or isocyanate functional groups; a catalyst for the curing of the functional groups. Many of the polyurethane adhesives cure by reacting with atmospheric moisture although other well-known curing agents can be used. The polyurethane adhesives can contain other additives such as adhesion promoters, UV stabilizers, carbon black, fillers, plasticizers, thixotropes and the like which are well known to those skilled in the art.

Preferably the adhesive has an isocyanate percentage of about 0.3 percent by weight or greater, more preferably about 0.5 part by weight or greater and more preferably about 0.75 percent by weight or greater, and preferably about 5 percent by weight or less and more preferably about 2.5 percent by weight or less.

The prepolymer is present in the adhesive composition in sufficient amount such that the adhesive is capable of bonding glass to another substrate, such as metal, plastic, a composite or fiberglass. Preferably the substrates are painted or colored plastic and more preferably the substrates are painted with acid resistant paints, such as acrylic melamine silane modified coatings (DuPont), melamine carbamate coatings, two part urethane coatings, or acid epoxy cure coatings. The adhesives of the invention are especially good for bonding windows to the DuPont silanated carbamate melamine and the PPG melamine carbamate paints. Preferably the prepolymer is present in an amount of about 30 part by weight or greater based on the weight of the adhesive, more preferably about 40 part by weight or greater, even more preferably about 45 part by weight or greater and most preferably about 50 part by weight or greater. More preferably the prepolymer is present in an amount of about 99.8 part by weight or less based on the weight of the adhesive and most preferably about 85 part by weight or less. In a preferred embodiment the mixture of a high molecular weight and a low molecular weight polymer is used.

Adhesives which have higher isocyanate contents, as defined by isocyanate percentage, bond better to treated unprimed coatings. Further the use of catalyst which promotes the isocyanate hydroxy moiety reaction enhances bonding of the adhesive to unprimed treated coated substrates. Preferably the catalyst is a tin catalyst which promotes the isocyanate-hydroxyl moiety reaction. Among preferred tin catalysts which promote the reaction of isocyanate groups with hydroxyl groups are those disclosed in U.S. Pat. No. 5,852,137 (incorporated herein by reference), tin carboxylates and dialkyltin acetylacetonates such as dibutyltin dilaurate, stannous octoate, stannous oxalate; dibutyltin oxide; dibutyltin bis (methylmaleate), dibutyltin bis(acetyl acetonate). The tin catalyst, based upon the tin content, is present in an amount of about 30 parts per million of tin or greater based on the weight of the sealant, more preferably 50 parts by million of tin or greater. The organotin catalyst is present in an amount of about 1.0 part or less of tin content based on the weight of the sealant, more preferably 0.5 part by weight or less and most preferably 0.1 part by weight or less.

The adhesive formulation may contain other additives commonly used in adhesives formulations as known to those skilled in the art. The adhesive of the invention may be formulated with fillers known in the art for use in adhesive compositions. By the addition of such materials, physical properties such as viscosity, flow rates, sag and the like can be modified. However, to prevent premature hydrolysis of the moisture sensitive groups of the prepolymer, it is preferable to thoroughly dry the fillers before admixture therewith.

Optional components of the adhesive of the invention include reinforcing fillers. Such fillers are well-known to those skilled in the art and include carbon black, titanium dioxide, calcium carbonate, surface treated silica, titanium oxide, fumed silica, and talc. Preferred reinforcing fillers comprise carbon black. In one embodiment, more than one reinforcing filler may be used, of which one is carbon black, and a sufficient amount of carbon black is used to provide the desired black color to the adhesive. The reinforcing fillers are used in sufficient amount to increase the strength of the adhesive and to provide thixotropic properties to the adhesive. Preferably the reinforcing filler is present in an amount of about 1 part by weight of the adhesive composition or greater, more preferably about 15 parts by weight or greater and most preferably about 20 parts by weight or greater. Preferably the reinforcing filler is present in an amount of about 40 parts by weight of the adhesive composition or less, more preferably about 35 parts by weight or less and most preferably about 33 parts by weight or less.

Among optional materials in the adhesive composition are clays. Preferred clays useful in the invention include kaolin, surface treated kaolin, calcined kaolin, aluminum silicates and surface treated anhydrous aluminum silicates. The clays can be used in any form which facilitate formulation of a pumpable adhesive. Preferably the clay is in the form of pulverized powder, spray dried beads or finely ground particles. Clays may be used in an amount of about 0 part by weight of the adhesive composition or greater, more preferably about 1 part by weight or greater and even more preferably about 6 parts by weight or greater. Preferably the clays are used in an amount of about 20 parts by weight or less of the adhesive composition and more preferably about 15 parts by weight or less.

The adhesive composition of this invention may further comprise plasticizers so as to modify the rheological properties to a desired consistency. Such materials are preferably free of water, inert to reactive groups and compatible with the polymer used in the adhesive. Suitable plasticizers are well-known in the art and preferable plasticizers include alkyl phthalates such as dialkyl phthalate, wherein the alkyl phthalate is linear with mixed $C_7$, $C_9$ and $C_{11}$ alkyl groups, diisononyl phthalate diisododecyl phthalate, dioctylphthalate or dibutylphthalate, partially hydrogenated terpene, commercially available as "HB-40", trioctyl phosphate, epoxy plasticizers, toluene-sulfamide, chloroparaffins, adipic acid esters, castor oil, solvents, n-methylpyrolidinone and alkyl naphthalenes. The preferred plasticizers are the phthalates. The more preferred plasticizers are the dialkyl phthalates wherein the alkyl group is mixed linear $C_7$, $C_9$ and $C_{11}$, diisononyl phthalate or diisododecyl phthalate. The amount of plasticizer in the adhesive composition is that amount which gives the desired Theological properties and which is sufficient to disperse the catalyst and other components in the system and to give the desired viscosity. The amounts disclosed herein include those amounts added during preparation of the prepolymer and during compounding of the adhesive. Preferably plasticizers are used in the adhesive composition in an amount of about 0 part by weight or greater based on the weight of the adhesive composition, more preferably about 5 parts by weight or greater, even more preferably about 10 parts by weight or greater and most preferably about 20 parts by weight or greater. The plasticizer is preferably used in an amount of about 45 parts by weight or less based on the total amount of the adhesive composition, more preferably about 40 parts by weight or less, even more preferably about 30 parts by weight or less and most preferably about 25 parts by weight or less.

The adhesive of this invention may further comprise stabilizers which function to protect the adhesive composition from moisture, thereby inhibiting advancement and preventing premature cross-linking of the polymer capable of cross-linking in the adhesive formulation. Included among such stabilizers are hydrocarbyl alkoxy silanes, such as vinyl trimethoxy silane, diethylmalonate, paratoluene sulfonyl isocyanate, benzyl chloride, alkyl ortho formates, and alkylphenol alkylates. Such stabilizers are preferably used in an amount of about 0.1 part by weight or greater based on the total weight of the adhesive composition, preferably about 0.3 part by weight or greater and more preferably about 0.5 part by weight or greater. Such stabilizers are used in an amount of about 5.0 parts by weight or less based on the weight of the adhesive composition, more preferably about 2.0 parts by weight or less and most preferably about 1.4 parts by weight or less.

Optionally, the adhesive composition may further comprise a thixotrope. Such thixotropes are well-known to those skilled in the art and include alumina, limestone, talc, zinc oxides, sulfur oxides, calcium carbonate, perlite, slate flour, salt (NaCl), and cyclodextrin. The thixotrope may be added to the adhesive of the composition in a sufficient amount to give the desired rheological properties. Preferably the thixotrope is present in an amount of about 0 part by weight or greater based on the weight of the adhesive composition, preferably about 1 part by weight or greater. Preferably the optional thixotrope is present in an amount of about 10 parts by weight or less based on the weight of the adhesive composition and more preferably about 2 parts by weight or less.

In some embodiments it is desirable to add an additional adhesion promoter to the composition. An adhesion promoter can be added to enhance adhesion to either the glass or to the surface of the substrate to which the glass is bonded. Adhesion promoters known to those skilled in the art may be used. Among preferred adhesion promoters for adhesion to coated surfaces, such as those coated with Gen IV paints commonly used in the automotive industry are vinyl alkoxy silanes, isocyanto alkoxy silanes and isocyanurate functional alkoxy silanes and aliphatic isocyanates. More preferred adhesion promoters include gamma-glycidoxypropyltrimethoxy silane, gamma-isocyanatopropyltrimethoxy silane, gamma-isocyanatopropylmethyldimethoxy silane, gamma-isocyanatopropyltriethoxy silane, beta (3,4-epoxycyclohexyl)ethyltriethoxysilane, gamma-glycidoxypropylmethyldimethoxy silane, tris(gamma-trimethoxysilylpropyl)isocyanurate, vinyltriethoxysilane, or vinyltrimethoxysilane. Examples of preferred aliphatic isocyanate of adhesion promoters include adducts, dimers, and trimers of 1,6-hexamethylene diisocyanate, isophorone diisocyanate and hydrogenated MDI (methylene diphenyl isocyanate). Such adhesion promoters are present in sufficient amount to promote the adhesion of the adhesive to the glass or other substrate surface to the desired level usually determined by testing the lap shear strength and failure mode of the bond to the substrate. Preferably the amount of adhesion promoter is about 10 parts by weight or less based on the weight of the adhesive; more preferably 5 parts by weight or less and most preferably about 3 parts by weight or less. Preferably the amount of adhesion promoter is about 0.01 part by weight or greater based on the weight of the adhesive; more preferably 0.1 part by weight or greater and most preferably about 0.5 part by weight or greater.

The adhesive composition can also contain heat stabilizers known in the art. Among preferred heat stabilizers are alkyl substituted phenols, phosphites, sebacates, and cinnamates. Among more preferred heat stabilizers are bis(1,2,2,6,6,-pentamethy-4-piperidinyl) sebacate, Irgafox-168, ethylene bis(oxyethylene) bis(3-tert-butyl-4-hydroxy-5-(methylhydrocinnamate), tetrakis isodecyl 4,4'isopropylidene diphosphite, and butylated hydroxytoluene. The preferred class of heat stabilizers are the sebacates such as phosphites and bis(1,2,2,6,6,-pentamethy-4-piperidinyl) sebacate. Preferred phosphites are aryl organophosphites, alkyl aryl organophosphites or alkyl organophosphates with alkyl aryl organophosphite preferred, for example, $C_{10}$ alkyl bisphenol A phosphite and phenyl diisodecyl phosphites. Preferably the amount of heat stabilizer is about 5 parts by weight or less based on the weight of the adhesive; more preferably 2 parts by weight or less and most preferably about 1.0 part by weight or less. Preferably the amount of heat stabilizer is about 0.01 part by weight or greater based on the weight of the adhesive; and most preferably about 0.5 part by weight or greater.

Other components commonly used in adhesive compositions may be used in the adhesive composition of this invention. Such materials are well-known to those skilled in the art and may include ultraviolet stabilizers and antioxidants.

As used herein, all parts by weight relative to the components of the adhesive composition are based on 100 total parts by weight of the adhesive composition and all percentages by weight are based on the weight of the adhesive composition. The sealant composition useful in the invention, may be formulated by blending the components together using means well-known in the art. Generally the components are blended in a suitable mixer. Such blending is preferably conducted in an inert atmosphere and in the absence of atmospheric moisture to prevent premature reaction. It may be advantageous to add any plasticizers to the reaction mixture for preparing the prepolymer so that such mixture may be easily mixed and handled. Alternatively, the plasticizers can be added during blending of all the components. Once the sealant composition is formulated, it is packaged in a suitable container such that it is protected from atmospheric moisture. Contact with atmospheric moisture could result in premature cross-linking of the prepolymer.

After treatment of the substrate with the plasma stream, the sealant composition is applied to the glass surface or the other substrate, preferably the glass surface, and is thereafter contacted with a second substrate. Thereafter the adhesive is exposed to curing conditions. In a preferred embodiment the other substrate is a plastic, metal, fiberglass or composite substrate which may optionally be painted. This method is especially effective for substrates painted with an acid resistant paint. In preferred embodiments, the surfaces to which the adhesive is applied are cleaned prior to application, see for example U.S. Pat. Nos. 4,525,511; 3,707,521 and 3,779,794, incorporated herein by reference. The glass is prepared by cleaning the surface to which the adhesive composition is to be applied. A solvent wipe can be used to do this. Generally a cloth or other device with an appropriate solvent is used to clean the surface. Preferably, the substrate is not primed, is unprimed, prior to applying the plasma treatment and adhesive to the surface. In a preferred embodiment of the invention, the substrate is a building or an automobile. The adhesive is preferably deposited as a bead on the portion of the glass to be bonded into the substrate. The bead can be deposited by any known method to those skilled in the art. In one embodiment, the bead can be deposited using a caulking gun or similar type of manual application device. In another embodiment, the bead may be deposited by an extrusion apparatus such as a robotic extrusion apparatus. The adhesive is located on the portion of the window which will be contacted with the structure into which it will be bonded. In one preferred embodiment, the adhesive is placed about the periphery of one face of the window. Typically the adhesive is in the form of a bead located about the periphery of the window. Preferably the bead is a profiled shape along the cross-sectional plane. In the embodiment where the glass is window glass designed for use in automobiles, the bead is applied to the portion of the glass to be contacted with the flange or encapsulated molding of the automobile window. The window can then be placed into the structure with the adhesive contacting both the window and the structure to which the window is to be bonded into. This contacting is performed by means well-known to those skilled in the art. In particular, the glass can be placed in the structure by hand, by the use of a robot and the like. Generally, the adhesives of the invention are applied at ambient temperature in the presence of atmospheric moisture. Exposure to atmospheric moisture is sufficient to result in curing of the adhesive. Curing may be further accelerated by applying heat to the curing sealant by any means known to one skilled in the art, for instance by convection heat, or microwave heating. Preferably the sealant of the invention is formulated to provide a working time of about 5 minutes or greater, more preferably about 10 minutes or greater. Preferably the working time is about 15 minutes or less and more preferably about 12 minutes or less. Further, the adhesive of the invention demonstrates a lap shear according to SAE J1529 after three days or curing at 23° C. and 50 percent relative humidity (RH) of about 360 psi (2.48 mPa) or greater and more preferably about 500 psi (3.45 mPa) or greater. Preferably the adhesives of the invention demonstrate a tack free time of 30 minutes or less. Preferably the adhesives of the invention exhibit an H-Tensile of 75 psi or greater (0.52 mPa) at 3 hours according to SAE 1722 Test and tested without using body primers.

Molecular weights as described herein are determined according to the following procedure: determined using the Waters Model 590 Gel Permeation Chromatograph. This unit is connected to a multiwave length detector and a differential refractometer to measure the elution volume. A column of styrogel is used for the size exclusion and it can determine molecular weights from 250 to 50,000. The molecular weight of the prepolymer is then determined by measuring the elution volume through this column using tetrahydrofuran as the eluting solvent. The molecular weight is then calculated from a calibration curve of molecular weight vs. elution volume obtained from a polystyrene polyethylene glycol column. The quoted molecular weights are weight average molecular weights unless otherwise specified.

Specific Embodiments

The following examples are provided to more fully illustrate the invention, and are not intended to limit the scope of the claim. Unless otherwise stated, all parts and percentages are by weight. All references to parts by weight are based on a total of 100 parts by weight in the adhesive formulation.

The following are tests used for the prepared sealants.

Quick Knife Adhesion Test

A 6.3 mm (width)×6.3 mm (height)×76.2 mm (length) size sealant bead is placed on 101.6 mm×101.6 mm piece of an acid resistant paint panel and the assembly is cured for a specific time in the condition of 23° C. and 50 percent relative humidity. The cured bead is then cut with a razor blade through to the painted surface at a 45 degree angle while pulling back the end of the bead at 180 degree angle. Notches are cut every 3 mm on the painted surface. The degree of adhesion is evaluated as adhesive failure (AF) and/or cohesive failure (CF). In case of adhesive failure, the cured bead can be separated from the painted surface, while in cohesive failure, separation occurs within the sealant bead as a result of cutting and pulling. The tested paint substrate can be used as supplied, or treated by wiping with isopropanol (IPA) or naphtha (NP), or treated with a flume plasma. For the sealant of the invention, adhesion of a sealant develops sooner to the flume plasma treated substrate than to the untreated or solvent wiped ones.

EXAMPLES 1 to 8

Panels (10 cm×30 cm) were sprayed with DuPont Gen VI baked at 285° F. (141° C.) for 30 minutes. Half of the panels were treated with an air plasma (FlumeJet™ supplied by PlasmaTreat™) for one or two passes, half of the panels were left untreated. The single pass treatment was evaluated a second time on separate sections of the painted panels. The panels were maintained approximately 30 mm from the plasma tip and were traversed across the stationary plasma tip at approximately 15 cm/s. Alternatively, the panels can be held stationary and the plasma tip caused to travel across the panels. A moisture curing urethane glass bonding adhesive, Betaseal® 15625 (Trademark of Essex Specialty Products) available from Dow Automotive, Auburn Hills, Mich. (a business unit of The Dow Chemical Company) was applied to the panels across both the treated and untreated surfaces (30 cm long bead) immediately after treatment. The urethane beads were allowed to cure at 23° C./50% RH environment for 2 and 4 days. Adhesion was evaluated using the Quick Knife Adhesion test. The adhesion results are summarized in the following table. The results show that adhesion to the panels improves after both a single and double pass under the plasma tip. With a single pass, adhesion was significantly improved compared to that on the untreated surface, on which no adhesion by Betaseal® 15625 was observed. Cohesive Failure means the adhesive experienced internal failure. Adhesive Failure means the adhesive failed at the adhesive substrate interface.

TABLE 1

| Example | Paint | Treatment | 2 day cure | 4 day cure |
| --- | --- | --- | --- | --- |
| 1* | Gen VI | Untreated Control | 0% CF | 0% CF |
| 2 | " | Half panel, one pass | 50% CF | 50% CF |
| 3 | " | One pass | 85% CF | 20% CF |
| 4 | " | Two pass | 90% CF | 100% CF |
| 5* | PPG carbamate | Untreated Control | 0% CF | 0% CF |
| 6 | " | Half panel, one pass | 50% CF | 50% CF |
| 7 | " | One pass | 25% CF | 25% CF |
| 8 | " | Two pass | 85% CF | 100% CF |

*Comparative Example

EXAMPLES 9–18

Several panels as described above were coated with DuPont Gen VI paint and baked in an oven at 285° F. (141° C.) for 30 minutes. In Examples 9 and 14 the adhesives were applied with no further treatment. In Examples 10 and 15 the panels were cleaned by wiping with a swab containing naphtha, and the panels received no further treatment. In Examples 11–13 and 16–18 the panels were exposed to a plasma jet at varying line speeds (no solvent or other cleaning was used for Examples 11–13 and 16–18). Faster line speed results in less exposure time. Thereafter a polyurethane adhesive useful for bonding glass Betaseal®15685 available from The Dow Chemical Company to substrates was applied to the panels of Examples 9–13 and a polyurethane adhesive, Betaseal® 15625, for bonding glass to a substrate available from The Dow Chemical Company was applied to the panels of Examples 14–18. Each sample was cured for 7 days at 23° C. and 50 percent relative humidity. The Quick Knife Adhesion test was performed on each sample at 3 and 7 days. The results are compiled in Table 2.

TABLE 2

| Example | Coating Treatment | 3 day QKA CF/AF | 7 day QKA CF/AF |
| --- | --- | --- | --- |
| 9 | None | 0/100 | 0/100 |
| 10 | Naphtha Wipe | 0/100 | 15/85 |
| 11 | 10 m/min | 0/100 | 0/100 |
| 12 | 15 m/min | 60/40 | 50/50 |
| 13 | 20 m/min | 25/75 | 25/75 |
| 14 | None | 0/100 | 0/100 |
| 15 | Naphtha Wipe | 70/30 | 70/30 |
| 16 | 10 m/min | 80/20 | 75/25 |
| 17 | 15 m/min | 60/40 | 50/50 |
| 18 | 20 m/min | 50/50 | 40/60 |

What is claimed is:

1. A method of bonding glass to a substrate without utilizing a primer on the substrate which comprises A) treating a surface of the unprimed substrate with a stream of air plasma using a jet having a nozzle;

B) applying to the treated surface of the unprimed substrate or to a glass surface an adhesive capable of bonding the treated substrate to glass;

C) contacting the glass and the unprimed substrate such that the adhesive is disposed between the treated surface of the unprimed substrate and the glass; and D) allowing the adhesive to cure to bond the glass to the treated surface of the unprimed substrate.

2. A method according to claim 1 wherein the unprimed substrate is the flange or encapsulated molding of an automobile adapted for holding a glass window into the automobile.

3. The method according to claim 1 wherein the adhesive is a polyurethane adhesive.

4. The method according to claim 3 wherein the polyurethane adhesive has an isocyanate content of 0.3 percent or greater.

5. The method according to claim 4 wherein the polyurethane adhesive has an isocyanate content of about 0.3 percent by weight to about 5 percent by weight.

6. The method according to claim 5 wherein the plasma stream comprises a yellow portion and is applied such that the yellow portion is in contact with the substrate.

7. The method according to claim 6 wherein the distance from the nozzle of the jet to the substrate of about 3 to about 25 mm.

8. The method of claim 7 wherein the distance from the nozzle of the jet to the substrate is about 6 to about 20 mm.

9. The method according to claim 7 wherein the polyurethane adhesive contains a tin catalyst present in an amount sufficient to provide from about 30 parts per million of tin to 1.0 percent by weight of tin based on the weight of the adhesive.

10. The method according to claim 9 wherein the substrate surface is treated to achieve a surface tension of about 30 dynes or greater.

11. The method of claim 10 wherein the surface is treated to achieve a surface tension of about 45 dynes or greater.

12. The method according to claim 10 wherein the plasma stream is applied to the substrate at a speed of about 1.5 meters per minute to about 75 meters per minute.

13. The method of claim 12 wherein the plasma stream is applied to the substrate at a speed of about 10 meters/minute to about 25 meters per minute.

14. The method according to claim 13 wherein the adhesive contains an adhesion promoter comprising a vinyl alkoxysilane, isocyanato alkoxysilane isocyanate functional alkoxysilane, an aliphatic isocyanate or a mixture thereof.

15. A method according to claim 12 wherein the substrate is subjected to multiple plasma treatments.

16. A method according to claim 14 wherein the substrate is exposed to about 2 to about 3 plasma treatments.

* * * * *